Patented Apr. 21, 1953

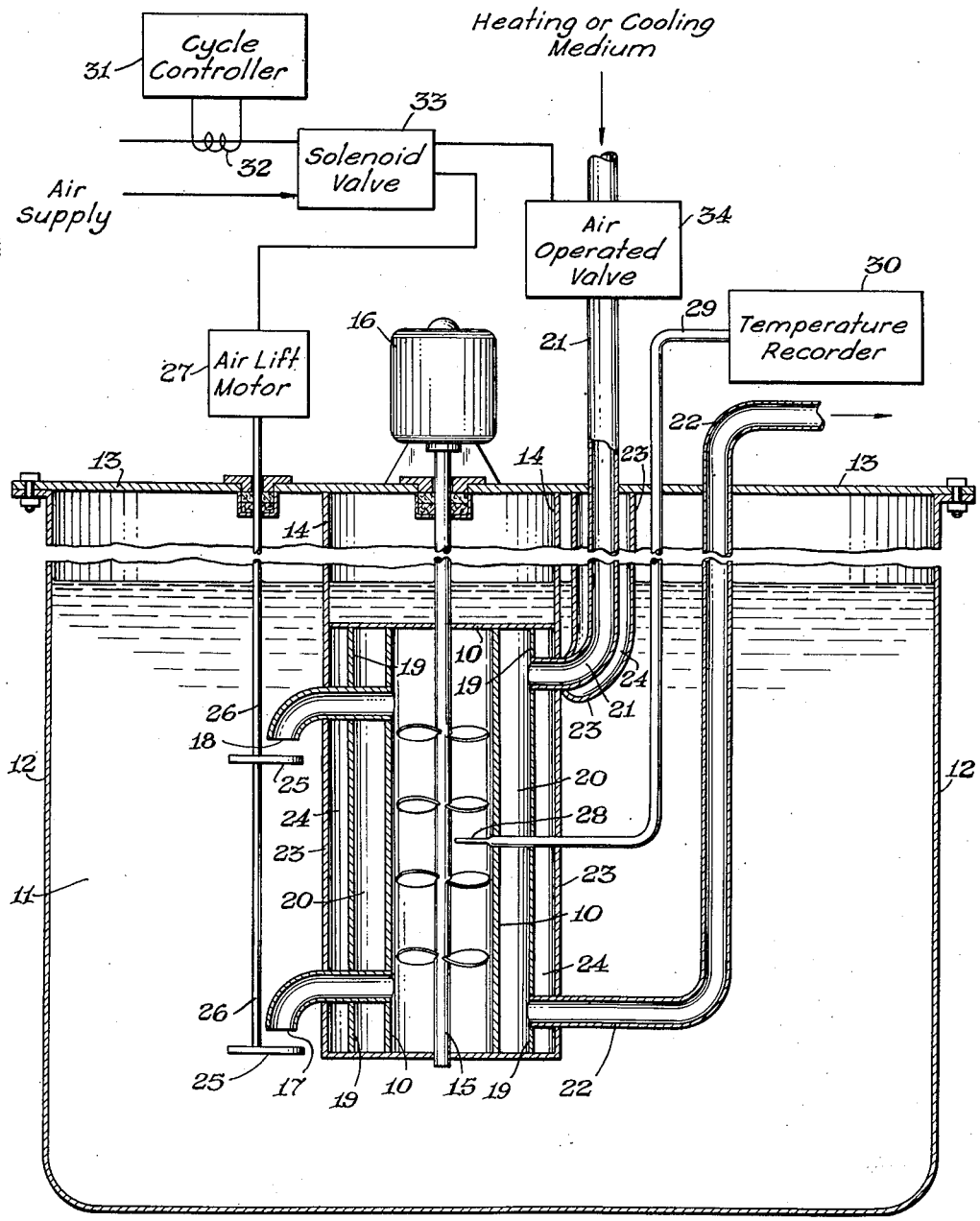

2,635,455

UNITED STATES PATENT OFFICE 2,635,455

AUTOMATIC FREEZING POINT MEASURING APPARATUS

Edward C. Staehling, Midland, Mich., assignor to The Dow Chemical Company, Midland, Mich., a corporation of Delaware Application July 2, 1951, Serial No. 234,770

2 Claims. (Cl. 73—17)

This invention relates to apparatus for determining and recording automatically the freezing point of liquids. It relates in particular to such an apparatus which makes its determinations while immersed in the liquid being tested.

Many commercially significant materials are required to meet rigid purity specifications before they can be sold. In the case of organic chemical compounds, various means are used to verify the quality of the materials. Among the characteristics which may be used as an index of the purity of a compound is its freezing point. In continuous production operations, it would be convenient and desirable to be able to have a record of the freezing point of the product at frequent intervals. In those chemical reactions in which an end point may be recognized by the freezing point of the desired product, it would be most helpful to have a record of the changes in freezing point of the reaction mixture so that, as the desired end point is approached, suitable steps may be taken toward termination of the reaction. In cases of the types mentioned, a useful apparatus would be a freezing point recording apparatus which is capable of making its determinations automatically, at frequent intervals, and at a point beneath the surface of the body of liquid being tested so that the samples tested are truly representative of the whole. The provision of such an apparatus is the principal object of the present invention.

The apparatus of the present invention comprises a sampling chamber immersed in the liquid to be tested, jacketed for circulation thereabout of a heat transfer medium, preferably insulated against thermal effects of the surrounding liquid, and having an inlet and an outlet for the liquid to be tested, means for opening and for closing both said inlet and said outlet, an agitator in said chamber, means for driving said agitator, continuous temperature recording means to indicate the temperature within the chamber, and means for controlling the intervals at which the sample in the chamber is changed.

The single figure of the accompanying drawing is an elevation and partial vertical section of the new apparatus, with a schematic representation of control means therefor.

Referring to the drawing, freezing chamber 10 is immersed beneath the liquid 11 to be tested in a tank or reaction vessel 12, being suspended from the coverplate 13 of tank 12 by means of hangers 14. Chamber 10 is fitted with a coaxial stirrer or agitator 15, driven by an externally mounted motor 16, and is provided with an inlet 17 and an outlet 18 for samples of the liquid 11 to be tested. Chamber 10 is surrounded, at least on its vertical walls, by jacket 19, providing a space 20 for circulation of heating or cooling fluid which may enter space 20 through pipe 21 and may leave through pipe 22. Chamber 10, its surrounding jacketed space 20, and the coolant inlet pipe 21 may be protected against thermal effects of the surrounding liquid 11 by means of an additional jacket 23, providing an insulating air space 24. Sample inlet 17 and outlet 18 are provided with removable cover plates or other full opening valve means or closures 25, mounted to operate simultaneously on rod 26, which is illustrated as being actuated by an airlift motor 27. At a point preferably near the center of chamber 10 is mounted a thermoelement 28 having leads 29 to a temperature recorder 30. The remaining parts of the apparatus comprise a cycle controller, or timer 31, for starting and stopping the flow of cooling fluid through pipe 21 and for closing and opening the ports 17 and 18 of the sample chamber 10. In the illustrated embodiment, controller 31 admits current at intervals to a solenoid 32, which actuates a valve 33, and the latter, when open, admits an air stream to an air operated valve 34 in line 21 and to the airlift motor 27.

In operation, motor 16 is operated continuously, turning the shaft of agitator 15, the pitched blades of which draw liquid 11 through inlet 17 into chamber 10 and expel it through outlet 18. When cycle controller 31 closes the electrical circuit through solenoid 32, valve 33 is opened, and an air stream causes motor 27 to operate, lifting cover plates 25 on shaft 26 into position to close ports 17 and 18. At the same time, the valve 34 is opened, and cooling fluid is circulated from pipe 21 through jacketed space 20 and out through pipe 22. Agitator 15 keeps the confined sample in chamber 10 in motion, and uniform cooling occurs by heat transfer from the sample, through the wall of chamber 10, to the coolant in space 20. A continuous temperature record is made by the recorder 30. When valves 25 are closed and cooling starts, there is a rapid drop in temperature until the freezing point is reached, when the temperature of the agitated and confined sample becomes fixed, as the freezing liquid is in equilibrium with its crystals. Thereafter, the cycle controller 31 opens the circuit to solenoid 32, closing valves 33 and 34 and stopping motor 27. Shaft 26 and valve members 25 drop, opening ports 17 and 18. The partially solidified sample in chamber 10 is melted by entry of hot liquid 11 through port 17, and is displaced through outlet 18. The timer element of controller 31 is set to allow chamber 10 to reach the temperature of liquid 11, and to be flushed free of all the previous charge, before the above-described cycle is repeated. The time consumed in a single cycle between two freezing point determinations may be as long as desired, or it may be as brief as the time required to reduce the temperature of the liquid sample to its freezing point and to displace that sample from the chamber with a new sample. The greater the differential between the liquid temperature and its freezing point, the longer will be the time required to determine the freezing point, using cooling fluid at a fixed temperature below the freezing point of the liquid. Similarly, the greater the differential between the freezing point of the liquid and the lower temperature of the cooling fluid, the shorter will be the time required to cool the sample to its freezing point, other factors being constant.

An apparatus of the type described has been installed in a reaction vessel in which a compound of low freezing point is converted to one with a freezing point near 200° C. During the course of the reaction a large number of intermediate products, each having several isomeric forms, is produced, and the freezing point of the mixtures range from sub-zero temperatures to that of the single desired end product. It is important that the reaction be stopped at the desired point, since further reaction produces a compound which not only has a very much lower freezing point but also has an entirely different chemical structure and cannot be used for the purposes for which the desired product is used. Before the installation of the present apparatus it was difficult to detect the proper point for terminating the reaction, and batches might be carried too far, or stopped short of the desired point. Owing to the viscous character of the mix, representative samples were difficult to obtain and, by the time they could be checked for freezing point, the reaction could easily have progressed too far. Since installation of the new apparatus, clean and representative samples are taken within the body of the reaction mixture and their freezing points are measured at intervals of 2 to 6 minutes, the intervals diminishing as the end point is approached. The reaction is traced by the recorded freezing points, and is discontinued within minutes of the recording of the proper value for the desired product.

The invention, then, offers the advantages of operating automatically, taking representative samples of the batch being tested, making frequent determinations of the freezing point of the batch, and returning the samples to the batch without waste or danger of contamination.

I claim:

1. Apparatus for determining automatically the freezing point of a liquid, comprising a jacketed sampling chamber to be immersed in the liquid to be tested, said chamber being jacketed for circulation thereabout of a coolant which is fluid at temperatures below the freezing point of the liquid being tested, an inlet and an outlet in the sampling chamber for the test liquid, means for opening and for closing both said inlet and said outlet, an agitator in said chamber serving both to stir the test liquid and to cause the same to flow through said outlet and inlet on opening thereof, means for driving said agitator, continuous temperature recording means connected with said chamber for indicating the temperature therein, and means for controlling the intervals at which the inlet and outlet of the chamber are opened and closed.

2. Apparatus for determining automatically the freezing point of a liquid, comprising a jacketed sampling chamber to be immersed in the liquid to be tested, said chamber being jacketed for circulation thereabout of a coolant which is fluid at temperatures below the freezing point of the liquid being tested, an inlet and an outlet in the sampling chamber for the test liquid, coacting means for opening and for closing both said inlet and said outlet simultaneously, a propeller type agitator in said chamber serving both to stir the test liquid and to cause the same to flow through said outlet and inlet on opening thereof, means for driving said agitator continuously, continuous temperature recording means connected with said chamber for indicating the temperature therein, means for controlling the intervals at which the inlet and outlet of the chamber are opened and closed, and means actuated by the last said means for circulating a cooling fluid through the jacket of the chamber while the inlet and outlet to the chamber are closed.

EDWARD C. STAEHLING.

References Cited in the file of this patent

UNITED STATES PATENTS

| Number | Name | Date |
|---|---|---|
| 1,189,785 | Brown | July 4, 1916 |
| 2,297,641 | Webber | Sept. 29, 1942 |
| 2,591,084 | Martin | Apr. 1, 1952 |